United States Patent
Gong et al.

(10) Patent No.: US 12,457,086 B2
(45) Date of Patent: Oct. 28, 2025

(54) COMMUNICATION METHOD AND APPARATUS

(71) Applicant: HUAWEI TECHNOLOGIES CO., LTD., Shenzhen (CN)

(72) Inventors: Mingxin Gong, Beijing (CN); Bingyu Qu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 496 days.

(21) Appl. No.: 17/895,128

(22) Filed: Aug. 25, 2022

(65) Prior Publication Data

US 2022/0407662 A1  Dec. 22, 2022

Related U.S. Application Data

(63) Continuation of application No. PCT/CN2020/076680, filed on Feb. 25, 2020.

(51) Int. Cl.
*H04L 5/00* (2006.01)

(52) U.S. Cl.
CPC .................. *H04L 5/0094* (2013.01)

(58) Field of Classification Search
CPC ..... H04L 5/0094; H04L 5/0048; H04L 5/005; H04L 5/1469; H04L 27/26134;
(Continued)

(56) References Cited

U.S. PATENT DOCUMENTS

| 2011/0085515 A1* | 4/2011 | Qu ................. H04L 5/0005 370/344 |
| 2011/0116436 A1* | 5/2011 | Bachu ............. H04L 5/0053 370/312 |

(Continued)

FOREIGN PATENT DOCUMENTS

| CN | 107370701 A | 11/2017 |
| CN | 107949991 A | 4/2018 |

(Continued)

OTHER PUBLICATIONS

English Translation of WIPO (WO-2017132969-A1) downloaded from PE2E Search on Dec. 2024 (Year: 2024).*

(Continued)

*Primary Examiner* — Gary Mui
(74) *Attorney, Agent, or Firm* — HAUPTMAN HAM, LLP

(57) ABSTRACT

A communication method and apparatus are provided. The method includes: A terminal device determines a first sequence whose length is $\Sigma_{i=0}^{M-1} K_i$, and sends the first sequence on M subcarrier groups, where an $i^{th}$ subcarrier group in the M subcarrier groups includes $K_i$ subcarriers on a same symbol, i=0, 1, ..., M−1, and frequency domain positions of subcarriers included in any two of the M subcarrier groups are different and belong to different symbols; and a sequence carried in each of the M subcarrier groups is a fragment of the first sequence, and fragments carried in any two subcarrier groups are different. According to the method, the terminal device sends the first sequence on the M subcarrier groups, so that interference between different terminal devices is small when channel estimation is performed by combining M symbols. This can effectively improve accuracy of channel estimation.

20 Claims, 10 Drawing Sheets

(58) Field of Classification Search
CPC ....... H04L 5/0007; H04L 27/36; H04L 27/38; H04L 5/0051
See application file for complete search history.

(56) References Cited

U.S. PATENT DOCUMENTS

| | | | |
|---|---|---|---|
| 2014/0301357 A1* | 10/2014 | Kim | H04L 27/26526 370/330 |
| 2019/0081839 A1* | 3/2019 | Qu | H04L 27/26 |
| 2019/0229962 A1* | 7/2019 | Peng | H04L 27/26 |
| 2019/0273587 A1 | 9/2019 | Takeda et al. | |
| 2019/0288808 A1 | 9/2019 | Baldemair et al. | |
| 2021/0351897 A1* | 11/2021 | Gong | H04L 5/0053 |
| 2022/0286259 A1* | 9/2022 | Liu | H04L 5/0048 |
| 2024/0014980 A1* | 1/2024 | Pawar | H04W 72/23 |

FOREIGN PATENT DOCUMENTS

| | | |
|---|---|---|
| CN | 111464478 A | 7/2020 |
| WO | WO-2017132969 A1 * | 8/2017 |

OTHER PUBLICATIONS

Extended European Search Report issued in corresponding European Application No. 20922193.6, dated Dec. 12, 2022, pp. 1-7.
"R2-1710077", RAN WG's progress on Nr Wi in the August and September meetings 2017, Oct. 6, 2017, total 120 pages.
International Search Report issued in corresponding International Application No. PCT/CN2020/076680, dated Nov. 20, 2020, pp. 1-11.

* cited by examiner

COMMUNICATION METHOD AND APPARATUS

CROSS-REFERENCE TO RELATED APPLICATIONS

This application is a continuation of International Application No. PCT/CN2020/076680, filed on Feb. 25, 2020, the disclosure of which is hereby incorporated by reference in its entirety.

TECHNICAL FIELD

This application relates to the field of wireless communication technologies, and in particular, to a communication method and apparatus.

BACKGROUND

In a wireless communication system, channel information may be usually obtained based on a reference signal. In a 5th-generation (5th-generation, 5G) communication system, channel information between a base station and a terminal device may be obtained based on a sounding reference signal (sounding reference signal, SRS). For example, the terminal device may send the SRS on a specific time-frequency resource. After receiving the SRS, the base station may perform channel estimation based on the received SRS, to obtain uplink channel information between the terminal device and the base station.

Further, in a time division duplex (time division duplex, TDD) system, a network device may obtain, according to reciprocity between uplink channel state information and downlink channel state information, the downlink channel state information based on the uplink channel state information. The downlink channel state information may be used to determine precoding, modulation and coding scheme, and the like during downlink data transmission. Therefore, accuracy of SRS channel estimation directly affects uplink or downlink throughput, especially in scenarios with large-scale antennas, high mobility, and coordination.

However, how to improve the accuracy of channel estimation still needs to be further studied.

SUMMARY

This application provides a communication method and apparatus, to improve accuracy of channel estimation.

According to a first aspect, an embodiment of this application provides a communication method. The method may be applied to a terminal device, or may be applied to a chip inside the terminal device. For example, the method is applied to the terminal device. In the method, the terminal device determines a first sequence whose length is $\Sigma_{i=0}^{M-1} K_i$, and sends the first sequence on M subcarrier groups, where an $i^{th}$ subcarrier group in the M subcarrier groups includes $K_i$ subcarriers on a same symbol, i=0, 1, ..., M−1, and frequency domain positions of subcarriers included in any two of the M subcarrier groups are different and belong to different symbols; and a sequence carried in each of the M subcarrier groups is a fragment of the first sequence, and fragments carried in any two subcarrier groups are different.

According to the method, the terminal device sends the first sequence on the M subcarrier groups, so that interference between different terminal devices is small when channel estimation is performed by combining M symbols. This can effectively improve accuracy of channel estimation.

In a possible design, the M subcarrier groups are M different frequency subbands, and bandwidths of at least (M−1) frequency subbands are the same.

In a possible design, an interval between any two adjacent symbols in M symbols corresponding to the M subcarrier groups is less than a first threshold; and/or an interval between the $1^{st}$ symbol and the last symbol in the M symbols corresponding to the M subcarrier groups is less than a second threshold.

In the foregoing manner, it can be effectively ensured that the M symbols are adjacent symbols, that is, channels of the M symbols may be considered almost unchanged. This helps perform channel estimation by combining a plurality of symbols.

In a possible design, subcarriers included in any one of the M subcarrier groups are continuous in frequency domain, or are distributed at equal intervals in frequency domain.

In a possible design, all subcarriers included in the M subcarrier groups are continuous in frequency domain, or are distributed at equal intervals in frequency domain.

In a possible design, each of the M subcarrier groups includes a same quantity of subcarriers.

In a possible design, a position of a fragment carried in each subcarrier group is determined based on frequency domain positions of subcarriers included in each subcarrier group.

In a possible design, if subcarriers included in the $i^{th}$ subcarrier group are located in a $(k-1)^{th}$ bit to a $(k+K_i-2)^{th}$ bit in a subcarrier sequence, a fragment carried in the $i^{th}$ subcarrier group is located in a $(k-1)^{th}$ bit to a $(k+K_i-2)^{th}$ bit in the first sequence, where the subcarrier sequence is obtained by sorting the subcarriers included in the M subcarrier groups in descending order of frequencies or in ascending order of frequencies, and k is an integer greater than 0.

In a possible design, the first sequence satisfies the following formula:

$$r(n) = Ae^{j\alpha n} x_q(n \bmod N_{ZC}), n = 0, 1, 2, \ldots, W-1$$

$$x_q(m) = e^{-j\frac{\pi q m(m+1)}{N_{ZC}}}$$

where r(n), n=0, 1, 2, . . . , W−1 is the first sequence, $W=\Sigma_{i=0}^{M-1} K_i$, $N_{ZC}$ is a maximum prime number less than or equal to W, a minimum prime number greater than W, a maximum prime number less than or equal to 2 W, or a minimum prime number greater than 2 W, q is an integer greater than 0 and less than $N_{ZC}$, A is a complex constant, α is a real constant, and j is an imaginary unit.

In a possible design, before the determining a first sequence, the method further includes: receiving indication information from a network device, where the indication information indicates to send the first sequence on a time-frequency resource, or the indication information indicates to send, on a time-frequency resource, M second sequences whose lengths each are $K_i$; and the time-frequency resource includes the M subcarrier groups.

In a possible design, before the determining a first sequence, the method further includes: determining that the indication information indicates to send the first sequence on the time-frequency resource.

In a possible design, the method further includes: receiving configuration information from the network device, where the configuration information indicates the time-frequency resource, and the configuration information includes the indication information.

In a possible design, the first sequence is an SRS sequence.

According to a second aspect, an embodiment of this application provides a communication method. The method may be applied to a network device, or may be applied to a chip inside the network device. For example, the method is applied to the network device. In the method, the network device receives a first signal carried in M subcarrier groups, where an $i^{th}$ subcarrier group in the M subcarrier groups includes $K_i$ subcarriers on a same symbol, i=0, 1, . . . , M−1, and frequency domain positions of subcarriers included in any two of the M subcarrier groups are different and belong to different symbols; and determines a first sequence whose length is $\Sigma_{i=0}^{M-1} K_i$, and processes the first signal based on the first sequence, where a sequence carried in each of the M subcarrier groups is a fragment of the first sequence, and fragments carried in any two subcarrier groups are different.

In a possible design, the M subcarrier groups are M different frequency subbands, and bandwidths of at least (M−1) frequency subbands are the same.

In a possible design, the processing the first signal based on the first sequence includes: performing channel estimation based on the first signal and the first sequence.

In a possible design, an interval between any two adjacent symbols in M symbols corresponding to the M subcarrier groups is less than a first threshold; and/or an interval between the $1^{st}$ symbol and the last symbol in the M symbols corresponding to the M subcarrier groups is less than a second threshold.

In a possible design, subcarriers included in any one of the M subcarrier groups are continuous in frequency domain, or are distributed at equal intervals in frequency domain.

In a possible design, all subcarriers included in the M subcarrier groups are continuous in frequency domain, or are distributed at equal intervals in frequency domain.

In a possible design, each of the M subcarrier groups includes a same quantity of subcarriers.

In a possible design, a position of a fragment carried in each subcarrier group is determined based on frequency domain positions of subcarriers included in each subcarrier group.

In a possible design, if subcarriers included in the $i^{th}$ subcarrier group are located in a $(k-1)^{th}$ bit to a $(k+K_i-2)^{th}$ bit in a subcarrier sequence, a fragment carried in the $i^{th}$ subcarrier group is located in a $(k-1)^{th}$ bit to a $(k+K_i-2)^{th}$ bit in the first sequence, where the subcarrier sequence is obtained by sorting the subcarriers included in the M subcarrier groups in descending order of frequencies or in ascending order of frequencies, and k is an integer greater than 0.

In a possible design, the first sequence satisfies the following formula:

$$r(n) = Ae^{j\alpha n}x_q(n \bmod N_{ZC}), n = 0, 1, 2, \ldots, W-1$$

$$x_q(m) = e^{-j\frac{\pi q m(m+1)}{N_{ZC}}}$$

where r(n), n=0, 1, 2, . . . , W−1 is the first sequence, $W = \Sigma_{i=0}^{M-1} K_i$, $N_{ZC}$ is a maximum prime number less than or equal to W, a minimum prime number greater than W, a maximum prime number less than or equal to 2 W, or a minimum prime number greater than 2 W, q is an integer greater than 0 and less than $N_{ZC}$, A is a complex constant, α is a real constant, and j is an imaginary unit.

In a possible design, the method further includes: sending indication information to a terminal device, where the indication information indicates to send the first sequence on a time-frequency resource, or the indication information indicates to send, on a time-frequency resource, M second sequences whose lengths each are $K_i$; and the time-frequency resource includes the M subcarrier groups.

In a possible design, the method further includes: sending configuration information to the terminal device, where the configuration information indicates the time-frequency resource, and the configuration information includes the indication information.

In a possible design, the first sequence is an SRS sequence.

It should be noted that the communication method described in the second aspect corresponds to the communication method described in the first aspect. Therefore, for related beneficial effects of the communication method described in the second aspect, refer to the first aspect.

According to a third aspect, this application provides a communication apparatus. The apparatus has functions of implementing any possible design of the first aspect. For example, the apparatus includes corresponding modules, units, or means (means) of performing steps in any possible design of the first aspect. The functions, the units, or the means may be implemented by software, or may be implemented by hardware, or may be implemented by hardware executing corresponding software.

In a possible design, the apparatus includes a processing unit and a communication unit. The communication unit may be configured to receive and send a signal, to implement communication between the apparatus and another apparatus. For example, the communication unit is configured to send an SRS to a network device; and the processing unit may be configured to perform some internal operations of the apparatus. Functions performed by the processing unit and the communication unit may correspond to the steps in any possible design of the first aspect.

In a possible design, the apparatus includes a processor, and may further include a transceiver. The transceiver is configured to receive and send a signal, and the processor executes program instructions, to complete the method in any possible design or implementation of the first aspect. The apparatus may further include one or more memories or may be coupled to one or more memories. The one or more memories may be integrated with the processor, or may be separate from the processor. This is not limited in this application. The memory may store a necessary computer program or necessary instructions for implementing the functions in the first aspect. The processor may execute the computer program or the instructions stored in the memory. When the computer program or the instructions are executed, the apparatus is enabled to implement the method in any possible design or implementation of the first aspect.

In a possible design, the apparatus includes a processor. The processor is coupled to a memory, and the memory may store a necessary computer program or necessary instructions for implementing the functions in the first aspect. The processor may execute the computer program or the instructions stored in the memory. When the computer program or the instructions are executed, the apparatus is enabled to implement the method in any possible design or implementation of the first aspect. The memory may alternatively be located inside the apparatus.

In a possible design, the apparatus includes at least one processor and an interface circuit. The at least one processor is configured to: communicate with another apparatus through the interface circuit, and perform the method in any possible design or implementation of the first aspect.

According to a fourth aspect, this application provides a communication apparatus. The apparatus has functions of implementing any possible design of the second aspect. For example, the apparatus includes corresponding modules, units, or means of performing steps in any possible design of the second aspect. The functions, the units, or the means may be implemented by software, or may be implemented by hardware, or may be implemented by hardware executing corresponding software.

In a possible design, the apparatus includes a processing unit and a communication unit. The communication unit may be configured to receive and send a signal, to implement communication between the apparatus and another apparatus. For example, the communication unit is configured to receive an SRS from a terminal device; and the processing unit may be configured to perform some internal operations of the apparatus. Functions performed by the processing unit and the communication unit may correspond to the steps in any possible design of the second aspect.

In a possible design, the apparatus includes a processor, and may further include a transceiver. The transceiver is configured to receive and send a signal, and the processor executes program instructions, to complete the method in any possible design or implementation of the second aspect. The apparatus may further include one or more memories or may be coupled to one or more memories. The one or more memories may be integrated with the processor, or may be separate from the processor. This is not limited in this application. The memory may store a necessary computer program or necessary instructions for implementing the functions in the second aspect. The processor may execute the computer program or the instructions stored in the memory. When the computer program or the instructions are executed, the apparatus is enabled to implement the method in any possible design or implementation of the second aspect.

In a possible design, the apparatus includes a processor. The processor is coupled to a memory, and the memory may store a necessary computer program or necessary instructions for implementing the functions in the second aspect. The processor may execute the computer program or the instructions stored in the memory. When the computer program or the instructions are executed, the apparatus is enabled to implement the method in any possible design or implementation of the second aspect. The memory may alternatively be located inside the apparatus.

In a possible design, the apparatus includes at least one processor and an interface circuit. The at least one processor is configured to: communicate with another apparatus through the interface circuit, and perform the method in any possible design or implementation of the second aspect.

According to a fifth aspect, an embodiment of this application further provides a communication system. The communication system includes a terminal device and a network device. The terminal device may be configured to perform the method in any possible design of the first aspect, and the network device may be configured to perform the method in any possible design of the second aspect.

According to a sixth aspect, an embodiment of this application further provides a computer storage medium. The storage medium stores a software program. When the software program is read and executed by one or more processors, the method according to any possible design of the first aspect and the second aspect can be implemented.

According to a seventh aspect, an embodiment of this application further provides a computer program. When the computer program is run on a computer, the computer is enabled to perform the method according to any possible design of the first aspect and the second aspect.

According to an eighth aspect, an embodiment of this application further provides a chip. The chip is configured to read a computer program stored in a memory, to perform the method according to any possible design of the first aspect and the second aspect According to a ninth aspect, an embodiment of this application provides a chip system. The chip system includes a processor, configured to support a communication apparatus in implementing the functions in the foregoing aspects. In a possible design, the chip system further includes a memory, and the memory is configured to store necessary program instructions and necessary data for the communication apparatus. The chip system may include a chip, or may include a chip and another discrete component.

These aspects or other aspects of this application are clearer and more comprehensible in descriptions of the following embodiments.

DESCRIPTION OF EMBODIMENTS

Figure 1:
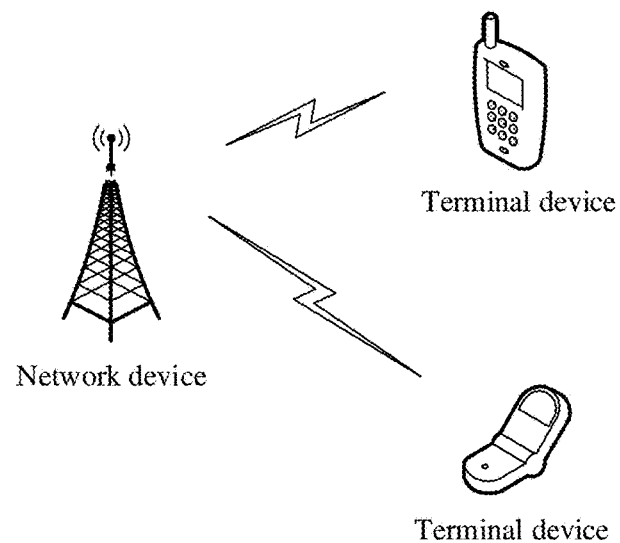
FIG. 1 is a schematic diagram of a possible system architecture to which an embodiment of this application is applicable.

The following describes technical solutions in embodiments of the present invention with reference to the accompanying drawings in embodiments of the present invention.

Some terms in embodiments of this application are first described, to help a person skilled in the art have a better understanding.

(1) A terminal device may be a wireless terminal device that may receive scheduling information and indication information of a network device. The wireless terminal device may be a device that provides voice and/or data connectivity for a user, a handheld device having a wireless connection function, or another processing device connected to a wireless modem. The terminal device may communicate with one or more core networks or the Internet by using a radio access network (for example, radio access network, RAN). The terminal device may be a mobile terminal device, for example, a mobile phone (or referred to as a "cellular" phone, a mobile phone (mobile phone)), a computer, or a data card, or may be, for example, a portable, pocket-sized, handheld, computer built-in, or in-vehicle mobile apparatus that exchanges voice and/or data with the radio access network. For example, the terminal device may be a personal communications service (personal communication service, PCS) phone, a cordless phone, a session initiation protocol (SIP) phone, a wireless local loop (wireless local loop, WLL) station, a personal digital assistant (personal digital assistant, PDA), a tablet computer (Pad), or a computer having wireless receiving and sending functions. The wireless terminal device may alternatively be referred to as a system, a subscriber unit (subscriber unit), a subscriber station (subscriber station), a mobile station (mobile station, MS), a remote station (remote station), an access point (access point, AP), a remote terminal device (remote terminal), an access terminal device (access terminal), a user terminal device (user terminal), a user agent (user agent), a subscriber station (subscriber station, SS), customer premises equipment (customer premises equipment, CPE), a terminal (terminal), user equipment (user equipment, UE), a mobile terminal (mobile terminal, MT), or the like. Alternatively, the terminal device may be a wearable device, a terminal device in a next-generation communication system, for example, a 5G communication system, a terminal device in a future evolved public land mobile network (public land mobile network, PLMN), or the like.

(2) A network device may be a device in a wireless network. For example, the network device may be a radio access network (radio access network, RAN) node (or device) that enables a terminal to access the wireless network, and may also be referred to as a base station. Currently, examples of some RAN devices are a gNodeB (gNodeB, gNB) in a 5G communication system, a transmission reception point (transmission reception point, TRP), an evolved NodeB (evolved NodeB, eNB), a radio network controller (radio network controller, RNC), and a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), or wireless fidelity (wireless fidelity, Wi-Fi) access point (access point, AP), a road side unit (road side unit, RSU), an access point in an integrated access and backhaul (integrated access and backhaul, IAB) system, a control node and a terminal node in a TSN network, and the like. In addition, in a network structure, the network device may include a centralized unit (centralized unit, CU) node, a distributed unit (distributed unit, DU) node, or a RAN device including a CU node and a DU node. In addition, in another possible case, the network device may be another apparatus that provides a wireless communication function for the terminal device. A specific technology and a specific device form that are used by the network device are not limited in embodiments of this application. For ease of description, in embodiments of this application, an apparatus that provides a wireless communication function for the terminal device is referred to as the network device.

(3) The terms "system" and "network" may be used interchangeably in embodiments of this application. "At least one" refers to one or more, and "a plurality of" refers to two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, "at least one of A, B, and C" includes A, B, C, AB, AC, BC, or ABC.

In addition, unless otherwise stated, ordinal numbers such as "first" and "second" in embodiments of this application are used to distinguish between a plurality of objects, and are not used to limit an order, a time sequence, priorities, or importance of the plurality of objects. For example, a first sequence and a second sequence are merely used to distinguish between different sequences, but do not indicate different priorities, importance, or the like of the two sequences.

FIG. 1 is a schematic diagram of a possible system architecture to which an embodiment of this application is applicable. The system architecture shown in FIG. 1 includes a network device and a terminal device. It should be understood that a quantity of network devices and a quantity of terminal devices in the system architecture are not limited in this embodiment of this application. In addition, in addition to the network device and the terminal device, the system architecture to which an embodiment of this application is applicable may further include other devices such as a core network device, a wireless relay device, and a wireless backhaul device. This is not limited in this embodiment of this application either. In addition, the network device in this embodiment of this application may integrate all functions into one independent physical device, or may distribute functions on a plurality of independent physical devices. This is not limited in this embodiment of this application either. In addition, the terminal device in this embodiment of this application may be connected to the network device in a wireless manner.

The system architecture shown above is applicable to communication systems of various radio access technologies (radio access technology, RAT), for example, a long term evolution (long term evolution, LTE) communication system, a 5G communication system, and another possible communication system.

The system architecture and a service scenario described in this embodiment of this application are intended to describe the technical solutions in embodiments of this application more clearly, and do not constitute a limitation on the technical solutions provided in embodiments of this application. A person of ordinary skill in the art may know that, with evolution of a communication system architecture and emergence of a new service scenario, the technical solutions provided in embodiments of this application are also applicable to similar technical problems.

In the system architecture shown in FIG. 1, a transmit end device may send a reference signal (reference signal, RS) to a receive end device. Correspondingly, after receiving the reference signal, the receive end device may perform channel estimation or channel sounding based on the reference signal. The transmit end device may be a terminal device, and the receive end device may be a network device. In this case, the reference signal may be an uplink reference signal. Alternatively, the transmit end device may be a network device, and the receive end device may be a terminal device. In this case, the reference signal may be a downlink reference signal. Further, the reference signal may be a sounding reference signal (sounding reference signal, SRS), a demodulation reference signal (demodulation reference signal, DMRS), or another possible reference signal. This is not specifically limited.

Figure 2A:
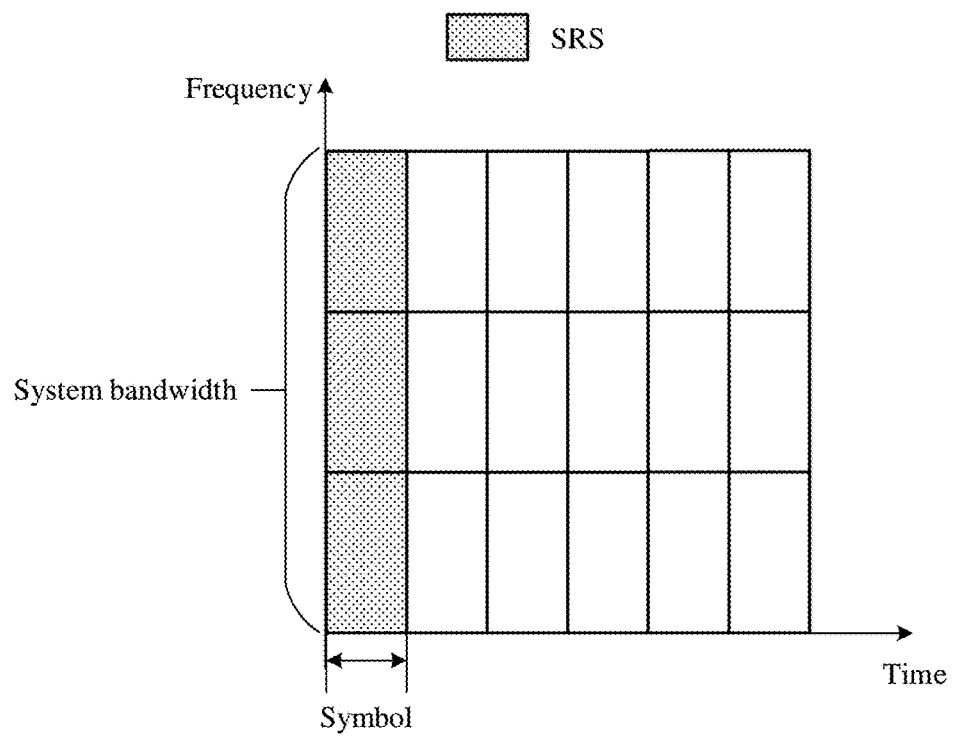
FIG. 2a is a schematic diagram of sending a full-bandwidth SRS on one symbol according to an embodiment of this application.

For example, the reference signal is an uplink SRS. The network device may obtain uplink channel information of a frequency band by measuring an SRS from the terminal device in the frequency band. Therefore, to obtain channel information of a system bandwidth, in a possible implementation (referred to as an implementation 1), the terminal device may send, on one symbol, an SRS whose bandwidth is large enough to cover most of the system bandwidth, as shown in FIG. 2a. In this way, after receiving the SRS, the network device may obtain full-bandwidth channel information. However, transmit power of the terminal device is limited. Therefore, when the system bandwidth is large, the terminal device sends the full-bandwidth SRS on one symbol. As a result, power on each subcarrier is low, and channel estimation performance of a receiver cannot meet a system requirement. Consequently, the foregoing manner has a limitation to some extent. The system bandwidth may also be referred to as a carrier bandwidth or a transmission bandwidth of a carrier. The network device may configure one or more carriers. Correspondingly, a transmission bandwidth corresponding to the one or more carriers configured by the network device may be understood as the system bandwidth. For example, if one network device configures one carrier, and a transmission bandwidth of the carrier is 100 MHz (megahertz), it may be considered that the system bandwidth is 100 MHz. For another example, if one network device configures five carriers, and a transmission bandwidth of each carrier is 20 MHz, it may also be considered that the system bandwidth is 100 MHz.

Figure 2B:
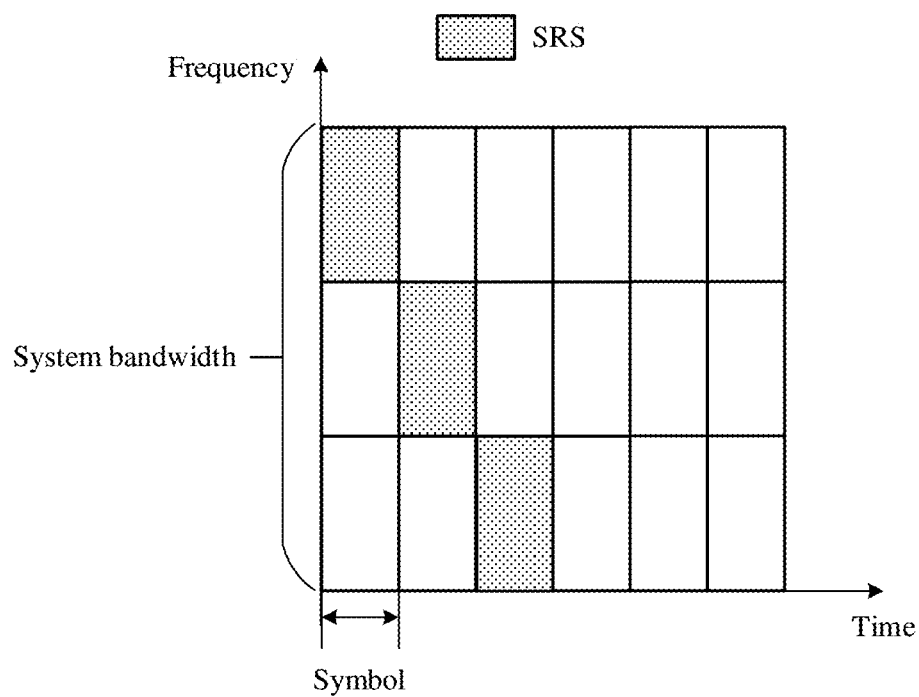
FIG. 2b is a schematic diagram of sending SRSs on a plurality of symbols through frequency hopping according to an embodiment of this application.

In another possible implementation (referred to as an implementation 2), the terminal device may send SRSs on a plurality of symbols through frequency hopping, the SRSs on different symbols may occupy different frequency domain resources, so that the SRSs on the plurality of symbols may cover the system bandwidth. FIG. 2b is a schematic diagram of sending SRSs on three continuous symbols through frequency hopping, where the SRSs on different symbols occupy different parts of the bandwidth.

For example, when sending the SRSs to the network device, the terminal device may generate an SRS sequence, then map the SRS sequence to a plurality of subcarriers on one symbol to generate a reference signal, where a length of the SRS sequence is a quantity of subcarriers occupied by the SRSs on one symbol, and send the reference signal to the network device. For example, in the 5G communication system, the SRS sequence may be a low peak to average power ratio (peak to average power ratio, PAPR) sequence based on a ZC sequence, a length of the ZC sequence is a maximum prime number less than or equal to a length of the SRS sequence, and the SRS sequence is obtained by cyclically extending the ZC sequence. When sending the SRSs on the plurality of symbols through frequency hopping, the terminal device sends an entire SRS sequence on each symbol, to ensure a low PAPR on each symbol. Correspondingly, the network device may separately receive SRSs on each symbol, and perform channel estimation based on the SRSs received on each symbol.

In the 5G communication system, interference between non-orthogonal SRSs increasingly becomes a performance bottleneck. For example, when a plurality of non-orthogonal SRSs need to be introduced to a same cell, or when channel information between a terminal device in another cell and a network device in a current cell needs to be estimated in a multi-site coordination scenario, all the SRSs may be strongly interfered by other non-orthogonal SRSs.

Further, the plurality of symbols occupied by the SRSs are usually a plurality of continuous symbols or a plurality of adjacent symbols. Therefore, although a channel of the plurality of symbols may be considered almost unchanged, the plurality of symbols on which the SRSs are sent through frequency hopping occupy different frequency subbands (Frequency subband), and a frequency spacing between these different frequency subbands already exceeds a coherence bandwidth of a multipath channel Therefore, currently, it is generally considered that even if channel estimation is performed by combining the plurality of symbols, there is no obvious performance gain.

However, the inventor finds, through research, that when channel estimation is performed by combining the plurality of symbols, a performance gain may still exist in a scenario in which there is severe interference. Therefore, a solution of performing channel estimation by combining the plurality of symbols is proposed, to improve accuracy of channel estimation. However, if the SRSs are generated and sent in the foregoing implementation 2, when channel estimation is performed by combining the plurality of symbols, all SRSs sent by each terminal device on the plurality of symbols use a same SRS sequence. Consequently, interference between different terminal devices is strong, resulting in impact on accuracy of a channel estimation result.

Based on this, an embodiment of this application provides a communication method, to improve the accuracy of channel estimation.

The communication method provided in this embodiment of this application may involve interaction between two communication apparatuses. The two communication apparatuses are, for example, a first communication apparatus and a second communication apparatus. The first communication apparatus may be a transmit end device (for example, sending a reference signal), and the second communication apparatus is a receive end device (for example, receiving a reference signal); or the second communication apparatus may be a transmit end device, and the first communication apparatus is a receive end device. The following uses an example in which the first communication apparatus is the transmit end device and the second communication apparatus is the receive end device.

Further, the first communication apparatus may be the terminal device or a communication apparatus that can support the terminal device in implementing a function required for the method, or may certainly be another communication apparatus, for example, a chip or a chip system. The second communication apparatus may be the network device or a communication apparatus that can support the network device in implementing a function required for the method, or may certainly be another communication apparatus, for example, a chip or a chip system. For ease of description, the following uses an example in which the method is performed by the network device and the terminal device, that is, an example in which the first communication apparatus is the terminal device and the second communication apparatus is the network device.

For example, in the communication method provided in this embodiment of this application, the terminal device may determine a first sequence whose length is $\Sigma_{i=0}^{M-1}K_i$, and send the first sequence on M subcarrier groups, where an $i^{th}$ subcarrier group in the M subcarrier groups includes $K_i$ subcarriers on a same symbol, i=0, 1, . . . , M−1, and frequency domain positions of subcarriers included in any two of the M subcarrier groups are different and belong to different symbols; and a sequence carried in each of the M subcarrier groups is a fragment of the first sequence, and fragments carried in any two subcarrier groups are different. According to the method, the terminal device sends the first sequence on the M subcarrier groups, so that interference between different terminal devices is small when channel estimation is performed by combining M symbols. This can effectively improve accuracy of channel estimation.

It should be noted that: (1) in this embodiment of this application, the network device and the terminal device may communicate with each other by using a licensed spectrum (licensed spectrum), an unlicensed spectrum (unlicensed spectrum), or both a licensed spectrum and an unlicensed spectrum. This is not limited. The network device and the terminal device may communicate with each other by using a spectrum less than 6 gigahertz (gigahertz, GHz), a spectrum greater than or equal to 6 GHz, or both a spectrum less than 6 GHz and a spectrum greater than or equal to 6 GHz. That is, this application is applicable to both a low-frequency (for example, sub 6G) scenario and a high-frequency (greater than or equal to 6G) scenario. A spectrum resource used between the network device and the terminal device is not limited in this embodiment of this application.

(2) Symbols in this embodiment of this application include but are not limited to an orthogonal frequency division multiplexing (orthogonal frequency division multiplexing, OFDM) symbol, a single carrier frequency division multiple access (single carrier frequency division multiple access, SC-FDMA) symbol, a sparse code multiple access (sparse code multiplexing access, SCMA) symbol, a filtered orthogonal frequency division multiplexing (filtered orthogonal frequency division multiplexing, F-OFDM) symbol, and a non-orthogonal multiple access (non-orthogonal multiple access, NOMA) symbol. The symbols may be specifically determined based on an actual situation. Details are not described herein.

Figure 3:
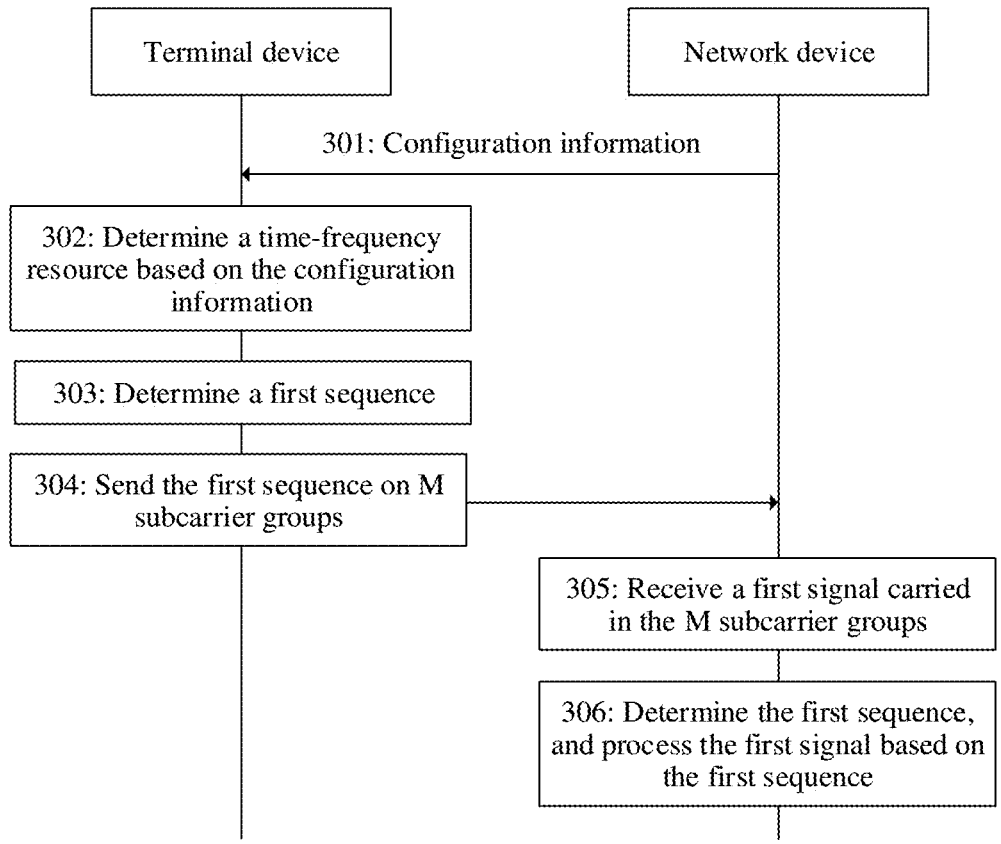
FIG. 3 is a schematic flowchart corresponding to a communication method according to an embodiment of this application.

FIG. 3 is a schematic flowchart corresponding to a communication method according to an embodiment of this application. As shown in FIG. 3, the method includes the following steps.

Step 301: A network device sends configuration information to a terminal device, where the configuration information indicates a time-frequency resource.

For example, the time-frequency resource may be used to carry SRSs, the time-frequency resource may include M subcarrier groups, an $i^{th}$ subcarrier group in the M subcarrier groups includes $K_i$ subcarriers on a same symbol, i=0, 1, . . . , M−1, and frequency domain positions of subcarriers included in any two of the M subcarrier groups are different and belong to different symbols. That is, different frequency subbands are occupied by the M subcarrier groups. Each of the M subcarrier groups may include a same quantity or different quantities of subcarriers. In this embodiment of this application, an example in which each of the M subcarrier groups includes the same quantity of subcarriers (that is, M different frequency subbands have a same bandwidth) is used for description, that is, $K_0=K_1=\ldots=K_{M-1}$.

The following separately describes M symbols corresponding to the M subcarrier groups and the M subcarrier groups in detail.

(1) M Symbols

Figure 4A:
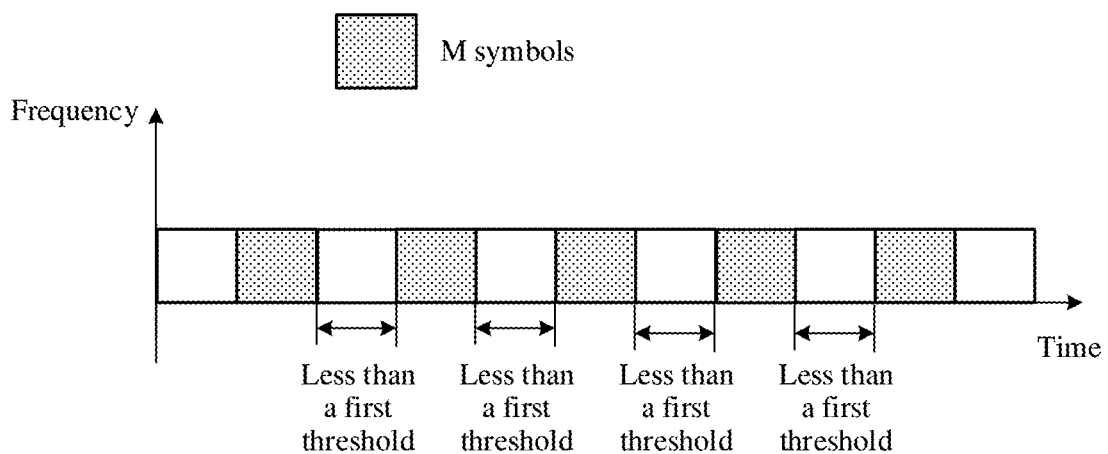
FIG. 4a is an example diagram of M symbols according to an embodiment of this application.

In an example, as shown in FIG. 4a, an interval between any two adjacent symbols in the M symbols is less than a first threshold. The first threshold may be predefined in a protocol, and a unit of the first threshold may be a symbol. For example, the first threshold is one symbol or two symbols.

Figure 4B:
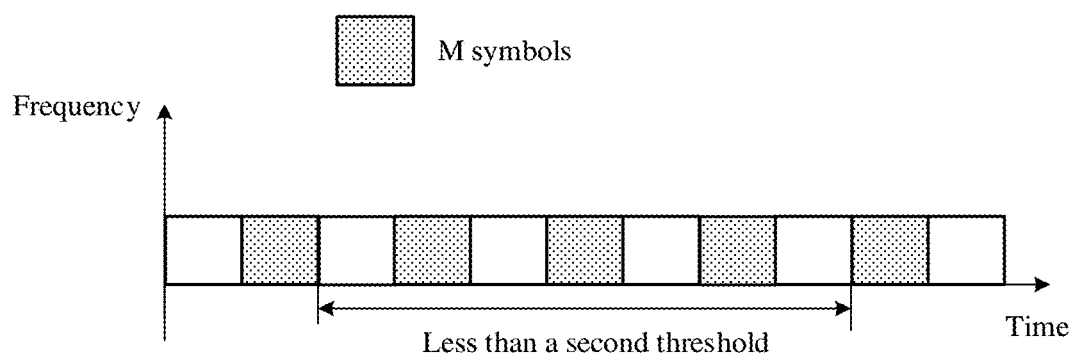
FIG. 4b is another example diagram of M symbols according to an embodiment of this application.

In another example, as shown in FIG. 4b, an interval between the $1^{st}$ symbol and the last symbol in the M symbols is less than a second threshold. The $1^{st}$ symbol is a foremost symbol in time domain, and the last symbol is a rearmost symbol in time domain. The second threshold may be predefined in a protocol, a unit of the second threshold may be a symbol, and the second threshold is greater than the first threshold.

Figure 4C:
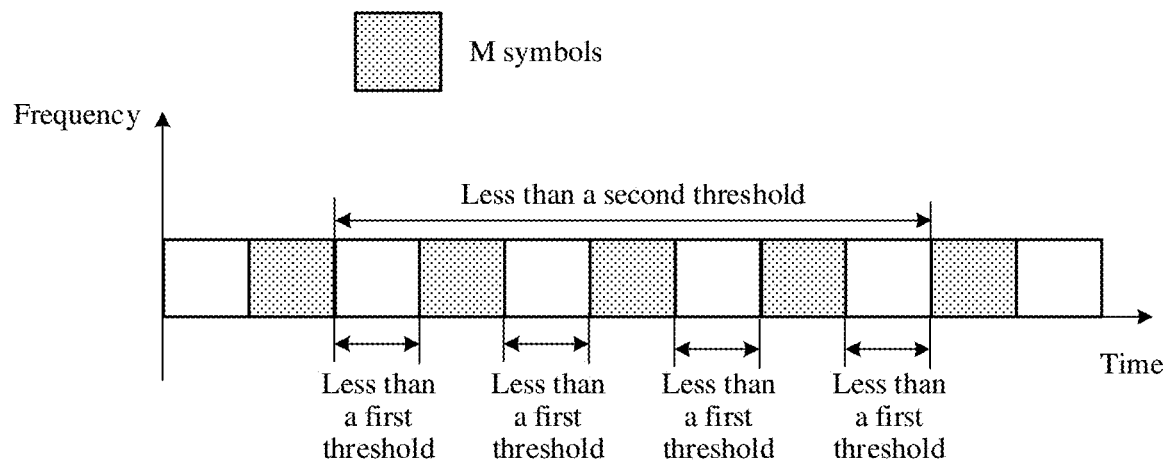
FIG. 4c is still another example diagram of M symbols according to an embodiment of this application.

In still another example, as shown in FIG. 4c, a spacing between any two adjacent symbols in the M symbols is less than a first threshold, and an interval between the $1^{st}$ symbol and the last symbol in the M symbols is less than a second threshold.

(2) M Subcarrier Groups

Figure 5A:
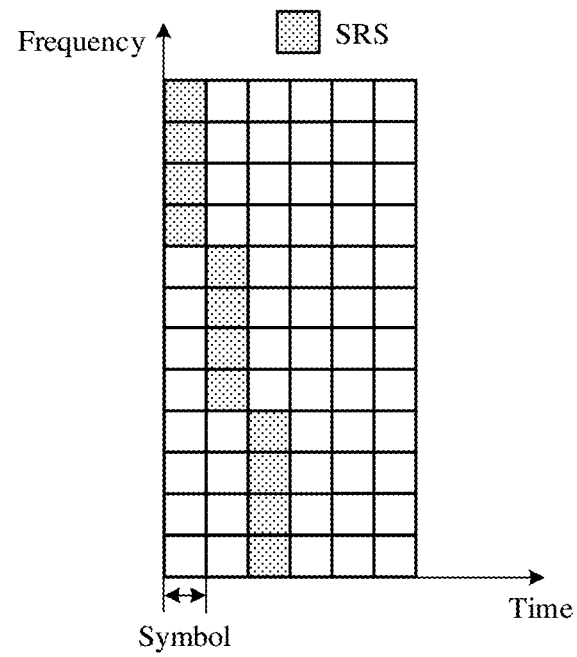
FIG. 5a is an example diagram of subcarriers included in any subcarrier group according to an embodiment of this application.
Figure 5B:
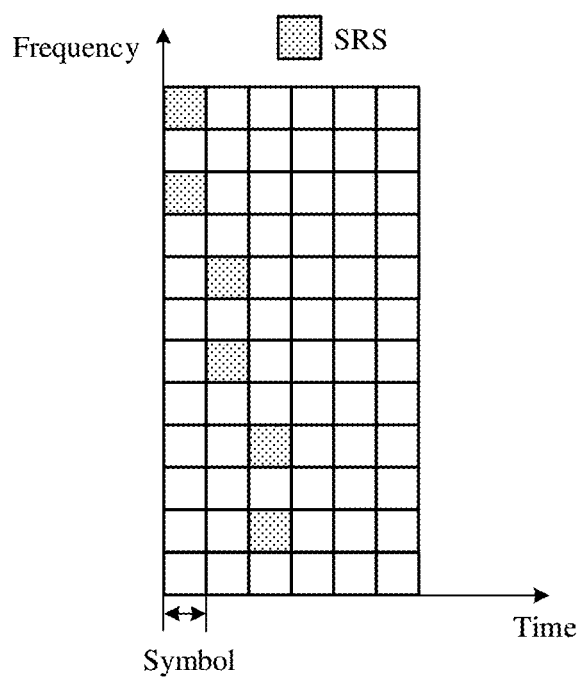
FIG. 5b is another example diagram of subcarriers included in any subcarrier group according to an embodiment of this application.

In an example, subcarriers included in any one of the M subcarrier groups are continuous in frequency domain. Refer to FIG. 5a. The subcarrier group includes four subcarriers that are continuous in frequency domain. Alternatively, subcarriers included in any one of the M subcarrier groups are distributed at equal intervals in frequency domain. Refer to FIG. 5b. The subcarrier group includes two subcarriers distributed at equal intervals (where the interval is one subcarrier) in frequency domain When the subcarriers included in the subcarrier group are distributed at equal intervals in frequency domain, a specific value of the interval may be predefined in a protocol. For example, the interval may be one subcarrier or three subcarriers.

Further, when the subcarriers included in any one of the M subcarrier groups are continuous in frequency domain, as shown in FIG. 5a, all subcarriers included in the M subcarrier groups are continuous in frequency domain. When the subcarriers included in any one of the M subcarrier groups are distributed at equal intervals in frequency domain, as shown in FIG. 5b, all subcarriers included in the M subcarrier groups may be distributed at equal intervals in frequency domain.

Figure 5C:
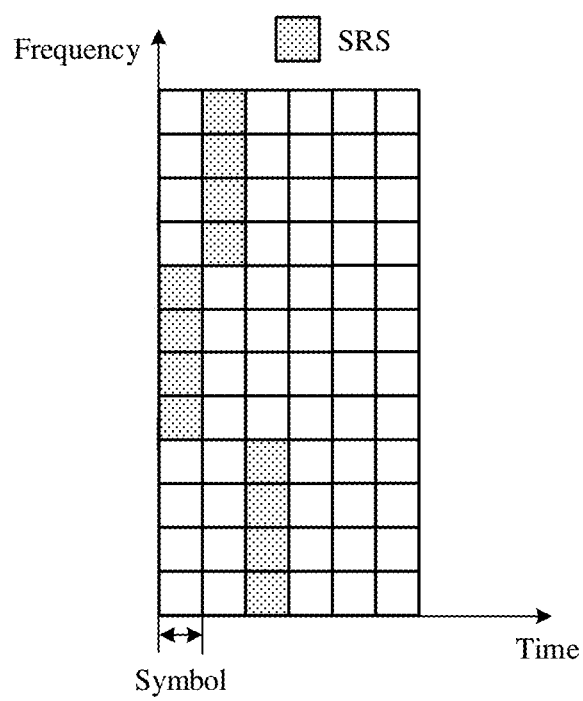
FIG. 5c is still another example diagram of subcarriers included in M subcarrier groups according to an embodiment of this application.

It should be noted that FIG. 5a and FIG. 5b are merely some possible examples of the subcarriers included in the M subcarrier groups. In another possible embodiment, there may be another possible example of the subcarriers included in the M subcarrier groups. For example, refer to FIG. 5c. This is not limited in this embodiment of this application.

In an optional solution, the network device may further indicate the terminal device to send a first sequence on the time-frequency resource or send, on the time-frequency resource, M second sequences whose lengths each are $K_i$. In an example, the network device may send indication information to the terminal device. The indication information indicates to send the first sequence on the time-frequency resource or send the M second sequences on the time-frequency resource. For example, the indication information may include one bit. If a value of the bit is 1, it indicates to send the first sequence on the time-frequency resource, or if a value of the bit is 0, it indicates to send the M second sequences on the time-frequency resource. For example, the indication information may be carried in the configuration information. In another example, if the configuration information carries the indication information, it indicates to send the first sequence on the time-frequency resource, or if the configuration information does not carry the indication information, it indicates to send the M second sequences on the time-frequency resource. Alternatively, if the configuration information does not carry the indication information, it indicates to send the first sequence on the time-frequency resource, or if the configuration information carries the indication information, it indicates to send the M second sequences on the time-frequency resource.

It may be understood that the terminal device may determine the second sequence in a plurality of manners. In a possible manner, the terminal device may generate the second sequence based on a ZC sequence. A second sequence whose length is $K_0$ (where for processing of a second sequence having another length, refer to processing of the second sequence) is used as an example. For example, the second sequence whose length is $K_0$ may satisfy the following formula:

$$r(n) = Ae^{j\alpha n}x_q(n \bmod N_{ZC}), n = 0, 1, 2, \ldots, K_0 - 1$$

$$x_q(m) = e^{-j\frac{\pi qm(m+1)}{N_{ZC}}}$$

where r(n), n=0, 1, 2, . . . , $K_0$–1 is the second sequence, $N_{ZC}$ is a maximum prime number less than or equal to $K_0$, a minimum prime number greater than $K_0$, a maximum prime number less than or equal to $2K_0$, or a minimum prime number greater than $2K_0$, q is an integer greater than 0 and less than $N_{ZC}$, A is a complex constant unrelated to n, α is a real constant unrelated to n, and j is an imaginary unit.

Correspondingly, in step 302, the terminal device receives the configuration information, and determines the time-frequency resource based on the configuration information.

For example, if the network device indicates the terminal device to send the first sequence on the time-frequency resource, the terminal device may perform step 303 and step 304. If the network device indicates the terminal device to send, on the time-frequency resource, M second sequences whose lengths each are $K_i$, the terminal device may determine the M second sequences whose lengths each are $K_i$, and send the M second sequences on the M subcarrier groups.

Step 303: The terminal device determines a first sequence whose length is $\Sigma_{i=0}^{M-1}K_i$, where the first sequence may be an SRS sequence.

Herein, the terminal device may determine the first sequence in a plurality of manners. In a possible manner, the terminal device may generate the first sequence based on a ZC sequence, for example, generate the first sequence by cyclically extending the ZC sequence, or obtain the first sequence by truncating the ZC sequence. In another possible embodiment, the terminal device may alternatively generate the first sequence based on another possible sequence (for example, a computer generated sequence (computer generated sequence, CGS)), for example, a CGS sequence in an LTE or NR protocol. This is not specifically limited. In this embodiment of this application, an example in which the terminal device generates the first sequence by cyclically extending the ZC sequence is used for description.

In an example, the first sequence generated by the terminal device may satisfy the following formula:

$$r(n) = Ae^{j\alpha n}x_q(n \bmod N_{ZC}), n = 0, 1, 2, \ldots, W - 1$$

$$x_q(m) = e^{-j\frac{\pi qm(m+1)}{N_{ZC}}}$$

where r(n), n=0, 1, 2, . . . , W–1 is the first sequence, W=$\Sigma_{i=0}^{M-1}K_i$, $N_{ZC}$ is a maximum prime number less than or equal to W, a minimum prime number greater than W, a maximum prime number less than or equal to 2 W, or a minimum prime number greater than 2 W, q is an integer greater than 0 and less than $N_{ZC}$, A is a complex constant unrelated to n, α is a real constant unrelated to n, and j is an imaginary unit.

For example, a manner in which the terminal device determines the first sequence may be the same as a manner in which the terminal device determines the second sequence.

Step 304: The terminal device sends the first sequence on the M subcarrier groups, where a sequence carried in each of the M subcarrier groups is a fragment of the first sequence, and fragments carried in any two subcarrier groups are different.

For example, a position of a fragment carried in each subcarrier group is determined based on frequency domain positions of subcarriers included in the subcarrier group. For example, a scenario shown in FIG. 5a or FIG. 5b is used as an example. If subcarriers included in the $i^{th}$ subcarrier group are located in a $(k-1)^{th}$ bit to a $(k+K_i-2)^{th}$ bit in a subcarrier sequence, a fragment carried in the $i^{th}$ subcarrier group is located in a $(k-1)^{th}$ bit to a $(k+K_i-2)^{th}$ bit in the first sequence, where the subcarrier sequence is obtained by sorting the subcarriers included in the M subcarrier groups in descending order of frequencies or in ascending order of frequencies, and k is an integer greater than 0.

Figure 5D:
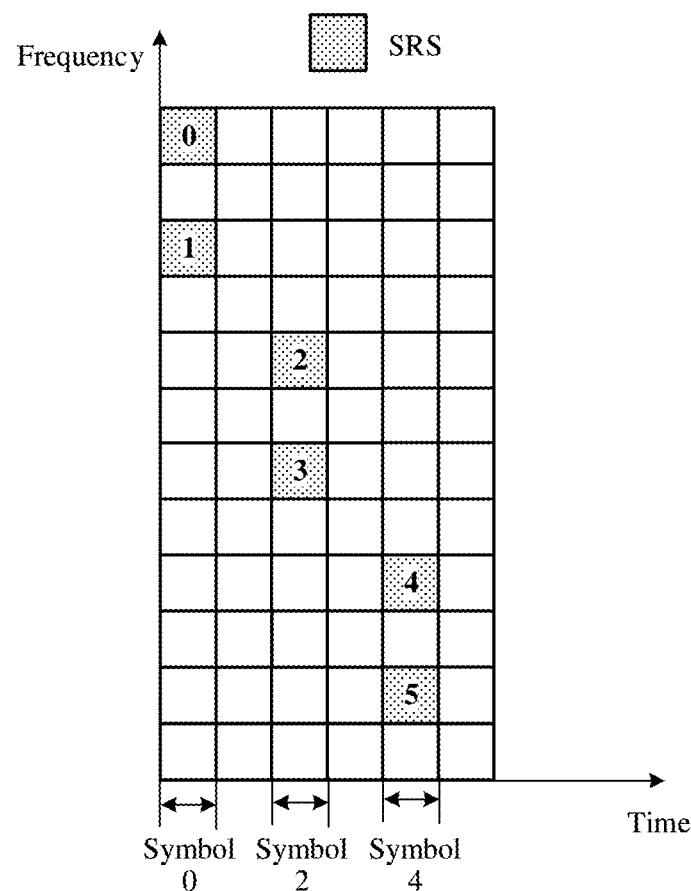
FIG. 5d is an example diagram in which M=3 and W=6 according to an embodiment of this application.

For example, refer to FIG. 5d. M=3, the $0^{th}$ subcarrier group includes a subcarrier 1 and a subcarrier 2 on a symbol 0, the $1^{th}$ subcarrier group includes a subcarrier 3 and a subcarrier 4 on a symbol 2, and the $2^{nd}$ subcarrier group includes a subcarrier 5 and a subcarrier 6 on a symbol 4. In this way, it can be learned that the first sequence is r(n), n=0, 1, 2, . . . , 5. For this example, the following describes two possible cases with reference to a case 1 and a case 2.

Figure 5E:
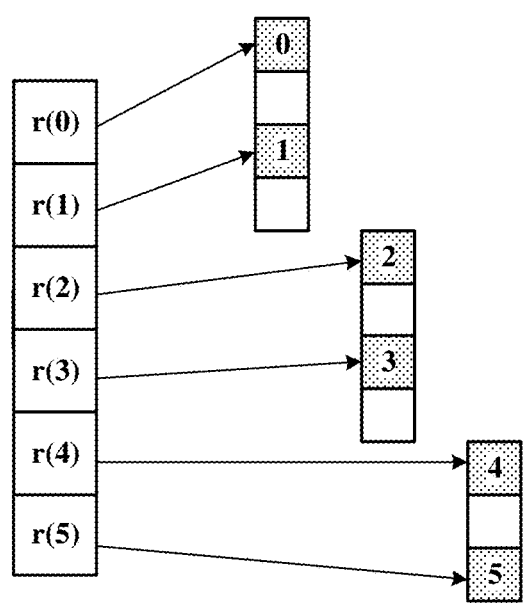
FIG. 5e is a schematic diagram of a mapping manner in a case 1 according to an embodiment of this application.

Case 1: A subcarrier sequence obtained by sorting the subcarriers included in the M subcarrier groups in descending order of frequencies may be a subcarrier 0, a subcarrier 1, a subcarrier 2, a subcarrier 3, a subcarrier 4, and a subcarrier 5. Therefore, refer to FIG. 5e. Subcarriers included in the $0^{th}$ subcarrier group are located in the $0^{th}$ bit and the $1^{st}$ bit in the subcarrier sequence, so that a fragment carried in the $0^{th}$ subcarrier group is located in the $0^{th}$ bit and the $1^{st}$ bit in the first sequence, that is, the fragment carried in the $0^{th}$ subcarrier group is r (0) and r (1), where r (0) may be carried on the subcarrier 0, and r (1) may be carried on the subcarrier 1. Subcarriers included in the $1^{st}$ subcarrier group are located in the $2^{nd}$ bit and the $3^{rd}$ bit in the subcarrier sequence, so that a fragment carried in the $1^{st}$ subcarrier group is located in the $2^{nd}$ bit and the $3^{rd}$ bit in the first sequence, that is, the fragment carried in the $1^{st}$ subcarrier group is r (2) and r (3), where r (2) may be carried on the subcarrier 2, and r (3) may be carried on the subcarrier 3. Subcarriers included in the $2^{nd}$ subcarrier group are located in the $4^{th}$ bit and the $5^{th}$ bit in the subcarrier sequence, so that a fragment carried in the $2^{nd}$ subcarrier group is located in the $4^{th}$ bit and the $5^{th}$ bit in the first sequence, that is, the fragment carried in the $2^{nd}$ subcarrier group is r (4) and r (5), where r (4) may be carried on the subcarrier 4, and r (5) may be carried on the subcarrier 5.

Figure 5F:
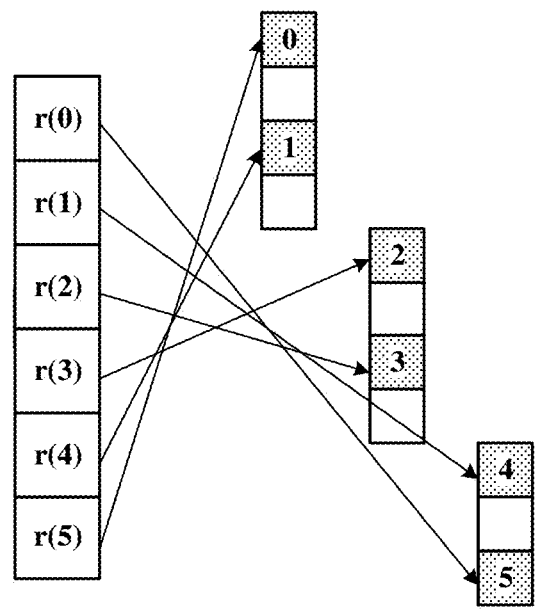
FIG. 5f is a schematic diagram of a mapping manner in a case 2 according to an embodiment of this application.

Case 2: A subcarrier sequence obtained by sorting the subcarriers included in the M subcarrier groups in descending order of frequencies may be a subcarrier 5, a subcarrier 4, a subcarrier 3, a subcarrier 2, a subcarrier 1, and a subcarrier 0. Therefore, refer to FIG. 5f. Subcarriers included in the $2^{nd}$ subcarrier group are located in the $0^{th}$ bit and the $1^{st}$ bit in the subcarrier sequence, so that a fragment carried in the $2^{nd}$ subcarrier group is located in the $0^{th}$ bit and the $1^{st}$ bit in the first sequence, that is, the fragment carried in the $2^{nd}$ subcarrier group is r (0) and r (1), where r (0) may be carried on the subcarrier 5, and r (1) may be carried on the subcarrier 4. Subcarriers included in the $1^{st}$ subcarrier group are located in the $2^{nd}$ bit and the $3^{rd}$ bit in the subcarrier sequence, so that a fragment carried in the $1^{st}$ subcarrier group is located in the $2^{nd}$ bit and the $3^{rd}$ bit in the first sequence, that is, the fragment carried in the $1^{st}$ subcarrier group is r (2) and r (3), where r (2) may be carried on the subcarrier 3, and r (3) may be carried on the subcarrier 2. Subcarriers included in the $0^{th}$ subcarrier group are located in the $4^{th}$ bit and the $5^{th}$ bit in the subcarrier sequence, so that a fragment carried in the $0^{th}$ subcarrier group is located in the $4^{th}$ bit and the $5^{th}$ bit in the first sequence, that is, the fragment carried in the $0^{th}$ subcarrier group is r (4) and r (5), where r (4) may be carried on the subcarrier 1, and r (5) may be carried on the subcarrier 0.

It should be noted that the foregoing case 1 and case 2 are merely two possible examples, and there may be another possible case during specific implementation. This is not specifically limited. When the terminal device sends the first sequence on the M subcarrier groups, the manner in the foregoing case 1 or the manner in the foregoing case 2 may be used. For example, the network device and the terminal device may agree in advance that the case 1 or the case 2 is to be used, or it may be predefined in a protocol that the case 1 or the case 2 is to be used.

Step 305: The network device receives a first signal carried in the M subcarrier groups.

For example, the network device may receive the first signal on the time-frequency resource based on the time-frequency resource configured for the terminal device. The first signal is generated by mapping, by the terminal device, different fragments of the first sequence into the M subcarrier groups. Therefore, that the network device receives a first signal carried in the M subcarrier groups may also be understood as that the network device receives the fragments carried in the M subcarrier groups.

Step 306: The network device determines the first sequence whose length is $\Sigma_{i=0}^{M-1} K_i$, and processes the first signal based on the first sequence.

For example, the network device may splice the fragments carried in the M subcarrier groups into the first sequence. For example, in FIG. 5e, the network device receives the fragment r (0) and r (1) on the subcarrier 0 and the subcarrier 1 on a symbol 0, the fragment r (2) and r (3) on the subcarrier 2 and the subcarrier 3 on a symbol 2, and the fragment r (4) and r (5) on the subcarrier 4 and the subcarrier 5 on a symbol 4, and then obtains r (0), r (1), r (2), r (3), r (4), and r (5) by splicing the fragments on the three symbols. For another example, in FIG. 5f, the network device receives the fragment r (4) and r (5) on the subcarrier 1 and the subcarrier 0 on a symbol 0, the fragment r (2) and r (3) on the subcarrier 3 and the subcarrier 2 on a symbol 2, and the fragment r (0) and r (1) on the subcarrier 5 and the subcarrier 4 on a symbol 4, and then obtains r (0), r (1), r (2), r (3), r (4), and r (5) by splicing the fragments on the three symbols.

For example, that the network device processes the first signal based on the first sequence may mean that the network device performs channel estimation based on the first signal and the first sequence. For specific implementation of channel estimation, refer to an existing solution. Details are not described herein again.

According to the foregoing method, because the terminal device maps different fragments of the first sequence into different subcarrier groups of the M symbols, one entire sequence is carried in the different subcarrier groups of the M symbols. Compared with a solution in which one entire sequence is carried on each symbol, when channel estimation is performed by combining the M symbols, interference between users is smaller, so that the accuracy of channel estimation can be effectively improved.

In addition, compared with the method in which each SRS symbol uses one entire SRS sequence, in the solution in this embodiment of this application, a PAPR of each SRS symbol may increase. However, by using the solution in this embodiment of this application, the PAPR may increase in a relatively limited manner (for example, when K=2, the PAPR almost does not increase, and when K=4, the PAPR increases slightly). This can improve the accuracy of channel estimation.

It should be noted that: (1) in this embodiment of this application, an example in which a sequence number or a mark number related to a sequence starts from 0 is used for description. For example, the first sequence is r(n), n=0, 1, 2, . . . , W−1. For another example, i=0, 1, . . . , M−1. In another possible embodiment, the foregoing sequence number or mark number may alternatively start from 1. For example, the first sequence is r(n), n=1, 2, . . . , W. For another example, i=1, 2, . . . , M. This is not specifically limited.

(2) Step numbers in FIG. 3 described in this embodiment of this application are merely an example of an execution procedure, and do not constitute any limitation on an execution sequence of the steps. In this embodiment of this application, there is no strict execution sequence between steps that do not have a time sequence dependency relationship with each other. The steps in FIG. 3 are not steps that need to be performed in the communication method provided in embodiments of this application. For example, the foregoing step 301 and step 302 may be selectively performed based on an actual requirement. When the foregoing step 301 and step 302 are not performed, the time-frequency resource may be a resource predefined in a protocol.

The foregoing mainly describes the solutions provided in embodiments of this application from a perspective of interaction between the network device and the terminal device. It may be understood that, to implement the foregoing functions, the network device or the terminal device may include a corresponding hardware structure and/or software module for performing each function. A person skilled in the art should be easily aware that, units and algorithm steps in the examples described with reference to embodiments disclosed in this specification can be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, division into functional units may be performed on the terminal device and the network device based on the foregoing method examples. For example, each functional unit may be obtained through division based on each corresponding function, or two or more functions may be integrated into one unit. The integrated unit may be implemented in a form of hardware, or may be implemented in a form of a software functional unit.

Figure 6:
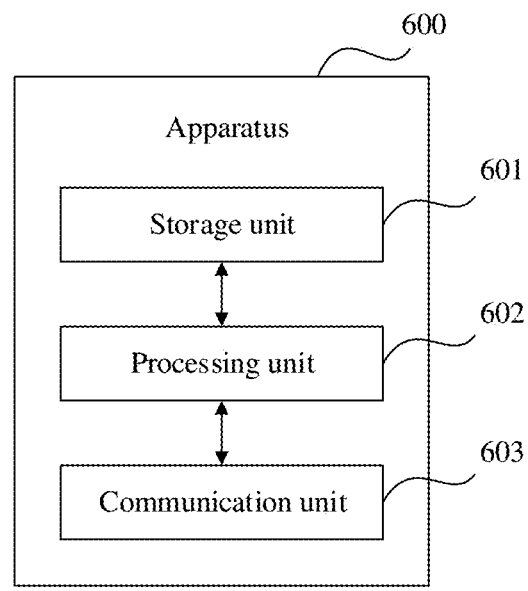
FIG. 6 is a possible example block diagram of an apparatus according to an embodiment of this application.

When an integrated unit is used, FIG. 6 is a possible example block diagram of an apparatus according to an embodiment of this application. As shown in FIG. 6, the apparatus 600 may include: a processing unit 602 and a communication unit 603. The processing unit 602 is configured to control and manage actions of the apparatus 600. The communication unit 603 is configured to support the apparatus 600 in communicating with another device. Optionally, the communication unit 603 is also referred to as a transceiver unit, and may include a receiving unit and/or a sending unit, respectively configured to perform a receiving operation and a sending operation. The apparatus 600 may further include a storage unit 601, configured to store program code and/or data of the apparatus 600.

The apparatus 600 may be the terminal device in any one of the foregoing embodiments, or may be a chip disposed in the terminal device. The processing unit 602 may support the apparatus 600 in performing actions of the terminal device in the foregoing method examples; or the processing unit 602 mainly performs internal actions of the terminal device in the method examples, and the communication unit 603 may support communication between the apparatus 600 and a network device. For example, the processing unit 602 is configured to perform step 302 and step 303 in FIG. 3, and the communication unit 603 may be configured to perform step 304 in FIG. 3.

Specifically, in an embodiment, the processing unit 602 is configured to determine a first sequence whose length is $\Sigma_{i=0}^{M-1} K_i$, and the communication unit 603 is configured to send the first sequence on M subcarrier groups, where an $i^{th}$ subcarrier group in the M subcarrier groups includes $K_i$ subcarriers on a same symbol, i=0, 1, . . . , M−1, and frequency domain positions of subcarriers included in any two of the M subcarrier groups are different and belong to different symbols; and a sequence carried in each of the M subcarrier groups is a fragment of the first sequence, and fragments carried in any two subcarrier groups are different.

In a possible design, the communication unit 603 is further configured to receive indication information from the network device, where the indication information indicates to send the first sequence on a time-frequency resource, or the indication information indicates to send, on a time-frequency resource, M second sequences whose lengths each are $K_i$; and the time-frequency resource includes the M subcarrier groups.

In a possible design, before determining the first sequence, the processing unit 602 is further configured to determine that the indication information indicates to send the first sequence on the time-frequency resource.

In a possible design, the communication unit 603 is further configured to receive configuration information from the network device, where the configuration information indicates the time-frequency resource, and the configuration information includes the indication information.

Alternatively, the apparatus 600 may be the network device in any one of the foregoing embodiments, or may be a chip disposed in the network device. The processing unit 602 may support the apparatus 600 in performing actions of the network device in the foregoing method examples. Alternatively, the processing unit 602 mainly performs internal actions of the network device in the method examples, and the communication unit 603 may support communication between the apparatus 600 and a terminal device. For example, the communication unit 603 may be configured to perform step 301 and step 305 in FIG. 3; and the processing unit 602 is configured to perform step 306 in FIG. 3.

Specifically, in an embodiment, the communication unit 603 is configured to receive a first signal carried in M subcarrier groups, where an $i^{th}$ subcarrier group in the M subcarrier groups includes $K_i$ subcarriers on a same symbol, i=0, 1, . . . , M−1, and frequency domain positions of subcarriers included in any two of the M subcarrier groups are different and belong to different symbols. The processing unit 602 is configured to: determine a first sequence whose length is $\Sigma_{i=0}^{M-1} K_i$, and process the first signal based on the first sequence, where a sequence carried in each of the M subcarrier groups is a fragment of the first sequence, and fragments carried in any two subcarrier groups are different.

In a possible design, the processing unit 602 is specifically configured to perform channel estimation based on the first signal and the first sequence.

In a possible design, the communication unit 603 is further configured to send indication information to the terminal device, where the indication information indicates to send the first sequence on a time-frequency resource, or the indication information indicates to send, on a time-frequency resource, M second sequences whose lengths each are $K_i$; and the time-frequency resource includes the M subcarrier groups.

In a possible design, the communication unit 603 is further configured to send configuration information to the terminal device, where the configuration information indicates the time-frequency resource, and the configuration information includes the indication information.

It should be understood that division into units in the foregoing apparatuses is merely logical function division. During actual implementation, all or some of the units may be integrated into one physical entity, or may be physically separate. In addition, all the units in the apparatus may be implemented by software invoked by a processing element, or may be implemented by hardware; or some units may be implemented by software invoked by a processing element, and some units may be implemented by hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, some or all of the units may be integrated together, or may be implemented independently. The processing element herein may also be referred to as a processor, and may be an integrated circuit having a signal processing capability. During implementation, the steps in the foregoing methods or the foregoing units may be implemented by using a hardware integrated logic circuit in the processing element, or may be implemented by software invoked by the processing element.

For example, a unit in any one of the foregoing apparatuses may be one or more integrated circuits configured to implement the foregoing method, for example, one or more application-specific integrated circuits (Application-Specific Integrated Circuit, ASIC), one or more microprocessors (digital signal processor, DSP), one or more field programmable gate arrays (Field Programmable Gate Array, FPGA), or a combination of at least two of the integrated circuits. For another example, when the unit in the apparatus may be implemented by scheduling a program by a processing element, the processing element may be a processor, for example, a central processing unit (central processing unit, CPU) or another processor that can invoke the program. For another example, the units may be integrated together and implemented in a form of a system-on-a-chip (system-on-a-chip, SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 7:
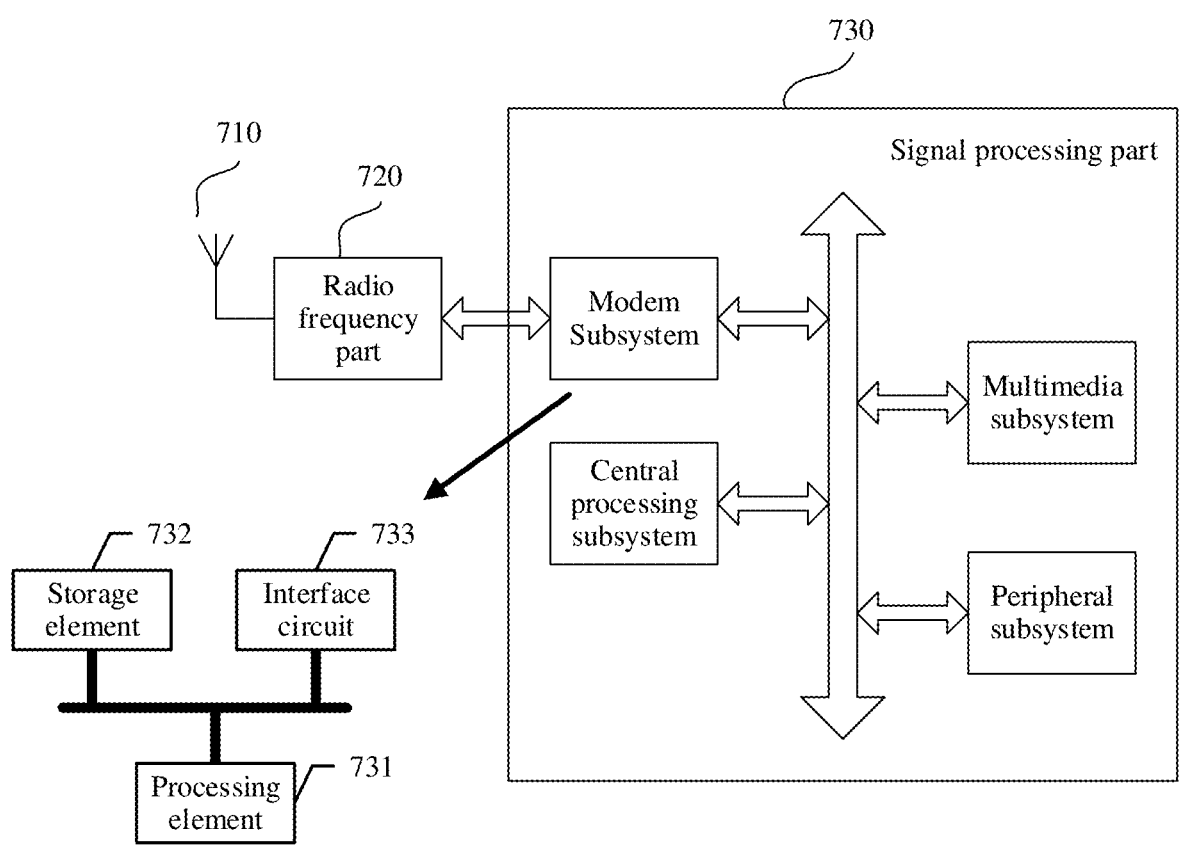
FIG. 7 is a schematic diagram of a structure of a terminal device according to an embodiment of this application.

FIG. 7 is a schematic diagram of a structure of a terminal device according to an embodiment of this application. The terminal device may be the terminal device in the foregoing embodiments, and is configured to implement operations of the terminal device in the foregoing embodiments. As shown in FIG. 7, the terminal device includes an antenna 710, a radio frequency part 720, and a signal processing part 730. The antenna 710 is connected to the radio frequency part 720. In a downlink direction, the radio frequency part 720 receives, through the antenna 710, information from a network device, and sends, to the signal processing part 730 for processing, the information from the network device. In an uplink direction, the signal processing part 730 processes information of the terminal device, and sends the information to the radio frequency part 720. The radio frequency part 720 processes the information of the terminal device, and then sends the processed information to the network device through the antenna 710.

The signal processing part 730 may include a modem subsystem, configured to process data at each communication protocol layer. The signal processing part may further include a central processing subsystem, configured to process an operating system and an application layer of the terminal device. In addition, the signal processing part may further include another subsystem, for example, a multimedia subsystem or a peripheral subsystem. The multimedia subsystem is configured to control a camera, a screen display, and the like of the terminal device. The peripheral subsystem is configured to implement a connection to another device. The modem subsystem may be a separately disposed chip.

The modem subsystem may include one or more processing elements 731, for example, a main control CPU and another integrated circuit. In addition, the modem subsystem may further include a storage element 732 and an interface circuit 733. The storage element 732 is configured to store data and a program. However, a program used to perform the methods performed by the terminal device in the foregoing methods may not be stored in the storage element 732, but is stored in a memory outside the modem subsystem, and is loaded and used by the modem subsystem when to be used. The interface circuit 733 is configured to communicate with another subsystem.

The modem subsystem may be implemented by a chip. The chip includes at least one processing element and an interface circuit. The processing element is configured to perform the steps of any one of the methods performed by the foregoing terminal device. The interface circuit is configured to communicate with another apparatus. In an implementation, units in the terminal device that implement the steps in the foregoing methods may be implemented by scheduling a program by the processing element. For example, the apparatus used in the terminal device includes a processing element and a storage element. The processing element invokes a program stored in the storage element, to perform the methods performed by the terminal device in the foregoing method embodiments. The storage element may be a storage element that is on the same chip as the processing element, namely, an on-chip storage element.

In another implementation, a program used to perform the methods performed by the terminal device in the foregoing methods may be in a storage element that is on a different chip from the processing element, namely, an off-chip storage element. In this case, the processing element invokes or loads the program from the off-chip storage element to the on-chip storage element, to invoke and perform the methods performed by the terminal device in the foregoing method embodiments.

In still another implementation, units in the terminal device that implement the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. The integrated circuits may be integrated together to form a chip.

Units in the terminal device that implement the steps in the foregoing methods may be integrated together, and implemented in a form of an SOC. The SOC chip is configured to implement the foregoing methods. At least one processing element and a storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods performed by the terminal device provided in the foregoing method embodiments. The processing element may perform, in a first manner, to be specific, by invoking the program stored in the storage element, some or all steps performed by the terminal device; or may perform, in a second manner, to be specific, by using a hardware integrated logic circuit in the processing element in combination with instructions, some or all steps performed by the terminal device; or may certainly perform, by combining the first manner and the second manner, some or all steps performed by the terminal device.

The processing element herein is the same as that described above, and may be implemented through a processor. A function of the processing element may be the same as a function of the processing unit described in FIG. 6. For example, the processing element may be a general-purpose processor, for example, a CPU, or may be one or more integrated circuits configured to implement the foregoing methods, for example, one or more ASICs, one or more microprocessors DSP, or one or more FPGAs, or a combination of at least two of the integrated circuit forms. The storage element may be implemented through a memory. A function of the storage element may be the same as a function of the storage unit described in FIG. 6. The storage element may be one memory, or may be a general term of a plurality of memories.

The terminal device shown in FIG. 7 can implement processes related to the terminal device in the method embodiment shown in FIG. 3. Operations and/or functions of the modules in the terminal device shown in FIG. 7 are respectively intended to implement the corresponding procedures in the foregoing method embodiments. For details, refer to the descriptions in the foregoing method embodiments. To avoid repetition, detailed descriptions are properly omitted herein.

Figure 8:
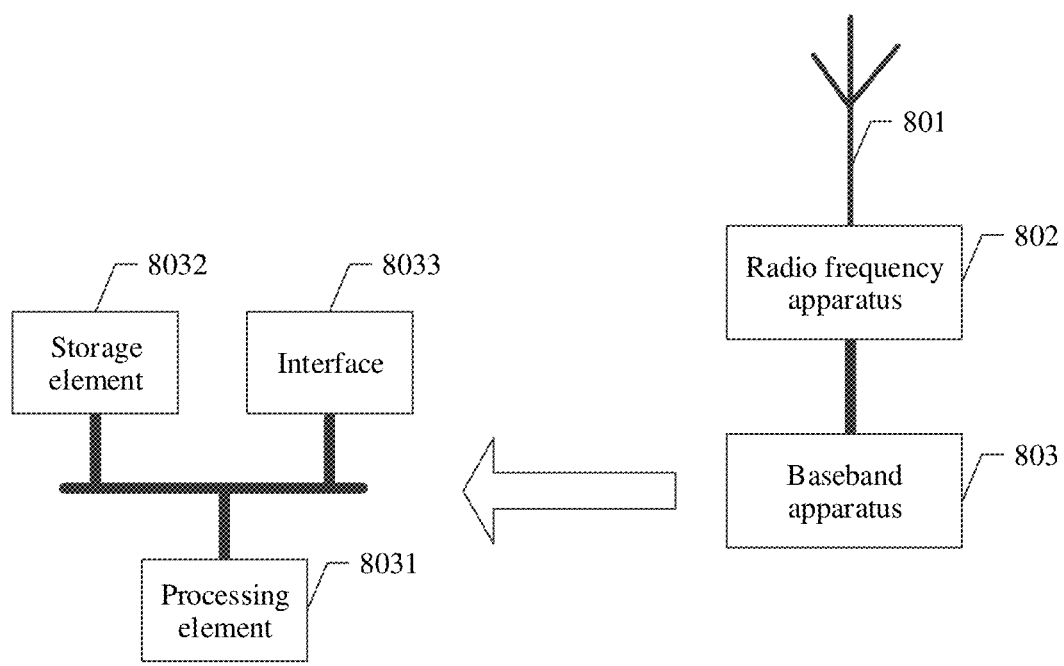
FIG. 8 is a schematic diagram of a structure of a network device according to an embodiment of this application.

FIG. 8 is a schematic diagram of a structure of a network device according to an embodiment of this application. The network device is configured to implement operations of the network device in the foregoing embodiments. As shown in FIG. 8, the network device includes an antenna 801, a radio frequency apparatus 802, and a baseband apparatus 803. The antenna 801 is connected to the radio frequency apparatus 802. In an uplink direction, the radio frequency apparatus 802 receives, through the antenna 801, information from a terminal device, and sends, to the baseband apparatus 803 for processing, the information from the terminal device. In a downlink direction, the baseband apparatus 803 processes information of the terminal device, and sends the information to the radio frequency apparatus 802. The radio frequency apparatus 802 processes the information of the terminal device, and then sends the processed information to the terminal device through the antenna 801.

The baseband apparatus 803 may include one or more processing elements 8031, for example, a main control CPU and another integrated circuit. In addition, the baseband apparatus 803 may further include a storage element 8032 and an interface 8033. The storage element 8032 is configured to store a program and data. The interface 8033 is configured to exchange information with the radio frequency apparatus 802. The interface is, for example, a common public radio interface (common public radio interface, CPRI). The foregoing apparatus used in the network device may be located in the baseband apparatus 803. For example, the foregoing apparatus used in the network device may be a chip on the baseband apparatus 803. The chip includes at least one processing element and an interface circuit. The processing element is configured to perform the steps of any one of the methods performed by the foregoing network device. The interface circuit is configured to communicate with another apparatus. In an implementation, units in the network device that implement the steps in the foregoing methods may be implemented by scheduling a program by the processing element. For example, the apparatus used in the network device includes a processing element and a storage element. The processing element invokes a program stored in the storage element, to perform the methods performed by the network device in the foregoing method embodiments. The storage element may be a storage element that is on the same chip as the processing element, namely, an on-chip storage element; or may be a storage element that is on a different chip from the processing element, namely, an off-chip storage element.

In another implementation, units in the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. The integrated circuits may be integrated together to forma chip.

Units in the network device that implement the steps in the foregoing methods may be integrated together, and implemented in a form of a system-on-a-chip (system-on-a-chip, SOC). For example, the baseband apparatus includes the SOC chip, and is configured to implement the foregoing methods. At least one processing element and a storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods performed by the network device provided in the foregoing method embodiments. The processing element may perform, in a first manner, to be specific, by invoking the program stored in the storage element, some or all steps performed by the network device; or may perform, in a second manner, to be specific, by using a hardware integrated logic circuit in the processing element in combination with instructions, some or all steps performed by the network device; or may certainly perform, by combining the first manner and the second manner, some or all steps performed by the network device.

The processing element herein is the same as that described above, and may be implemented through a processor. A function of the processing element may be the same as a function of the processing unit described in FIG. 6. For example, the processing element may be a general-purpose processor, for example, a CPU, or may be one or more integrated circuits configured to implement the foregoing methods, for example, one or more ASICs, one or more microprocessors DSP, or one or more FPGAs, or a combination of at least two of the integrated circuit forms. The storage element may be implemented through a memory. A function of the storage element may be the same as a function of the storage unit described in FIG. 6. The storage element may be one memory, or may be a general term of a plurality of memories.

The network device shown in FIG. 8 can implement processes related to the network device in the method embodiment shown in FIG. 3. Operations and/or functions of the modules in the network device shown in FIG. 8 are respectively intended to implement the corresponding procedures in the foregoing method embodiments. For details, refer to the descriptions in the foregoing method embodiments. To avoid repetition, detailed descriptions are properly omitted herein.

An embodiment of this application further provides a computer-readable storage medium, configured to store computer software instructions that need to be executed by the foregoing processor, and the computer software instructions include a program that needs to be executed by the foregoing processor.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

During implementation, the steps of the methods provided in embodiments may be completed by using a hardware integrated logical circuit in the processor, or by using instructions in a form of software. The steps in the methods disclosed with reference to embodiments of this application may be directly performed and completed by a hardware processor, or may be performed and completed by using a combination of hardware in the processor and a software module.

It should be noted that the memory or the storage unit in this embodiment of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these memories and any memory of another proper type.

All or some of the foregoing embodiments may be implemented by software, hardware, firmware, or any combination thereof. When the software is used for implementation, all or some of embodiments may be implemented in a form of a computer program product. The computer program product includes one or more computer programs or instructions. When the computer programs or the instructions are loaded and executed on a computer, the procedures or functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by the computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid-state drive, SSD).

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor may read information from the storage medium and write information to the storage medium. Optionally, the storage medium may alternatively be integrated into the processor. The processor and the storage medium may be disposed in the ASIC, and the ASIC may be disposed in a terminal device. Optionally, the processor and the storage medium may alternatively be disposed in different components of the terminal device.

What is claimed is:

1. A communication method, wherein the method comprises:
    determining a first sequence whose length is $E_{i=0}^{M-1} K_i$; and
    sending the first sequence on M subcarrier groups correspondingly in M symbols, wherein
    an $i^{th}$ subcarrier group in the M subcarrier groups comprises $K_i$ subcarriers on a same symbol among the M symbols, $i=0, 1, \ldots, M-1$, each of M and $K_i$ is a natural number, M is 2 or greater, and frequency domain positions of subcarriers comprised in any two of the M subcarrier groups are different and belong to different symbols among the M symbols; and
    a sequence carried in each of the M subcarrier groups is a fragment of the first sequence, and fragments of the first sequence carried in any two of the M subcarrier groups are different.

2. The method according to claim 1, wherein
    all subcarriers comprised in each of the M subcarrier groups are continuous to each other in frequency domain, or are distributed at equal intervals in frequency domain.

3. The method according to claim 1, wherein
    a position of a fragment of the first sequence carried in each subcarrier group among the M subcarrier groups is determined based on the frequency domain positions of the subcarriers comprised in said each subcarrier group.

4. The method according to claim 3, wherein
the subcarriers comprised in the $i^{th}$ subcarrier group are located in a $(k-1)^{th}$ bit to a $(k+K_i-2)^{th}$ bit in a subcarrier sequence,
a fragment of the first sequence carried in the $i^{th}$ subcarrier group is located in a $(k-1)^{th}$ bit to a $(k+K_i-2)^{th}$ bit in the first sequence,
the subcarrier sequence is obtained by sorting the subcarriers comprised in the M subcarrier groups in descending order of frequencies or in ascending order of frequencies, and
k is an integer greater than 0.

5. The method according to claim 1, wherein the first sequence satisfies the following formulas:

$$r(n) = Ae^{j\alpha n} x_q(n \bmod N_{ZC}), n = 0, 1, 2, \ldots, W-1$$

$$x_q(m) = e^{-j\frac{\pi q m(m+1)}{N_{ZC}}}$$

wherein
r(n), n=0, 1, 2, . . . , W−1 is the first sequence, $W=\Sigma_{i=0}^{M-1}K_i$, $N_{ZC}$ is a maximum prime number less than or equal to W, a minimum prime number greater than W, a maximum prime number less than or equal to 2 W, or a minimum prime number greater than 2 W,
q is an integer greater than 0 and less than $N_{ZC}$,
A is a complex constant unrelated to n,
α is a real constant unrelated to n, and
j is an imaginary unit.

6. A communication method, wherein the method comprises:
receiving a first signal carried in M subcarrier groups correspondingly in M symbols, wherein an $i^{th}$ subcarrier group in the M subcarrier groups comprises $K_i$ subcarriers on a same symbol among the M symbols, i=0, 1, . . . , M−1, each of M and $K_i$ is a natural number, M is 2 or greater, and frequency domain positions of subcarriers comprised in any two of the M subcarrier groups are different and belong to different symbols among the M symbols;
determining a first sequence whose length is $\Sigma_{i=0}^{M-1}K_i$; and
processing the first signal based on the first sequence, wherein a sequence carried in each of the M subcarrier groups is a fragment of the first sequence, and fragments of the first sequence carried in any two of the M subcarrier groups are different.

7. The method according to claim 6, wherein
all subcarriers comprised in each of the M subcarrier groups are continuous to each other in frequency domain, or are distributed at equal intervals in frequency domain.

8. The method according to claim 6, wherein
a position of a fragment of the first sequence carried in each subcarrier group among the M subcarrier groups is determined based on the frequency domain positions of the subcarriers comprised in said each subcarrier group.

9. The method according to claim 8, wherein
the subcarriers comprised in the $i^{th}$ subcarrier group are located in a $(k-1)^{th}$ bit to a $(k+K_i-2)^{th}$ bit in a subcarrier sequence,
a fragment of the first sequence carried in the $i^{th}$ subcarrier group is located in a $(k-1)^{th}$ bit to a $(k+K_i-2)^{th}$ bit in the first sequence,
the subcarrier sequence is obtained by sorting the subcarriers comprised in the M subcarrier groups in descending order of frequencies or in ascending order of frequencies, and
k is an integer greater than 0.

10. The method according to claim 6, wherein the first sequence satisfies the following formulas:

$$r(n) = Ae^{j\alpha n} x_q(n \bmod N_{ZC}), n = 0, 1, 2, \ldots, W-1$$

$$x_q(m) = e^{-j\frac{\pi q m(m+1)}{N_{ZC}}}$$

wherein
r(n), n=0,1,2, . . . , W−1 is the first sequence, $W=\Sigma_{i=0}^{M-1}K_i$, $N_{ZC}$ is a maximum prime number less than or equal to W, a minimum prime number greater than W, a maximum prime number less than or equal to 2 W, or a minimum prime number greater than 2 W,
q is an integer greater than 0 and less than $N_{ZC}$,
A is a complex constant unrelated to n,
α is a real constant unrelated to n, and
j is an imaginary unit.

11. A communication apparatus, comprising:
at least one processor, and
a memory storing programming instructions executable by the at least one processor to instruct the communication apparatus to perform operations comprising:
determining a first sequence whose length is $\Sigma_{i=0}^{M-1}K_i$; and
sending the first sequence on M subcarrier groups correspondingly in M symbols, wherein an $i^{th}$ subcarrier group in the M subcarrier groups comprises $K_i$ subcarriers on a same symbol among the M symbols, i=0, 1, . . . , M−1, each of M and $K_i$ is a natural number, M is 2 or greater, and frequency domain positions of subcarriers comprised in any two of the M subcarrier groups are different and belong to different symbols among the M symbols; and
a sequence carried in each of the M subcarrier groups is a fragment of the first sequence, and fragments of the first sequence carried in any two of the M subcarrier groups are different.

12. The apparatus according to claim 11, wherein
all subcarriers comprised in each of the M subcarrier groups are continuous to each other in frequency domain, or are distributed at equal intervals in frequency domain.

13. The apparatus according to claim 11, wherein
a position of a fragment of the first sequence carried in each subcarrier group among the M subcarrier groups is determined based on the frequency domain positions of the subcarriers comprised in said each subcarrier group.

14. The apparatus according to claim 13, wherein
the subcarriers comprised in the $i^{th}$ subcarrier group are located in a $(k-1)^{th}$ bit to a $(k+K_i-2)^{th}$ bit in a subcarrier sequence, a fragment of the first sequence carried in the $i^{th}$ subcarrier group is located in a $(k-1)^{th}$ bit to a $(k+K_i-2)^{th}$ bit in the first sequence, the subcarrier sequence is obtained by sorting the subcarriers comprised in the M subcarrier groups in descending order of frequencies or in ascending order of frequencies, and k is an integer greater than 0.

15. The apparatus according to claim 11, wherein the first sequence satisfies the following formulas:

$$r(n) = Ae^{j\alpha n}x_q(n \bmod N_{ZC}), n = 0, 1, 2, \ldots, W-1$$

$$x_q(m) = e^{-j\frac{\pi qm(m+1)}{N_{ZC}}}$$

wherein r(n), n=0,1,2, ..., W−1 is the first sequence, $W = \Sigma_{i=0}^{M-1} K_i$, $N_{ZC}$ is a maximum prime number less than or equal to W, a minimum prime number greater than W, a maximum prime number less than or equal to 2 W, or a minimum prime number greater than 2 W, q is an integer greater than 0 and less than $N_{ZC}$, A is a complex constant unrelated to n, $\alpha$ is a real constant unrelated to n, and j is an imaginary unit.

16. A communication apparatus, comprising:

at least one processor; and a memory storing programming instructions executable by the at least one processor to instruct the communication apparatus to perform operations comprising:

receiving a first signal carried in M subcarrier groups correspondingly in M symbols, wherein an $i^{th}$ subcarrier group in the M subcarrier groups comprises $K_i$ subcarriers on a same symbol among the M symbols, i=0, 1, ..., M−1, each of M and $K_i$ is a natural number, M is 2 or greater, and frequency domain positions of subcarriers comprised in any two of the M subcarrier groups are different and belong to different symbols among the M symbols;

determining a first sequence whose length is $\Sigma_{i=0}^{M-1} K_i$; and processing the first signal based on the first sequence, wherein a sequence carried in each of the M subcarrier groups is a fragment of the first sequence, and fragments of the first sequence carried in any two of the M subcarrier groups are different.

17. The apparatus according to claim 16, wherein all subcarriers comprised in each of the M subcarrier groups are continuous to each other in frequency domain, or are distributed at equal intervals in frequency domain.

18. The apparatus according to claim 16, wherein a position of a fragment of the first sequence carried in each subcarrier group among the M subcarrier groups is determined based on the frequency domain positions of the subcarriers comprised in said each subcarrier group.

19. The apparatus according to claim 18, wherein the subcarriers comprised in the $i^{th}$ subcarrier group are located in a $(k-1)^{th}$ bit to a $(k+K_i-2)^{th}$ bit in a subcarrier sequence, a fragment of the first sequence carried in the $i^{th}$ subcarrier group is located in a $(k-1)^{th}$ bit to a $(k+K_i-2)^{th}$ bit in the first sequence, the subcarrier sequence is obtained by sorting the subcarriers comprised in the M subcarrier groups in descending order of frequencies or in ascending order of frequencies, and k is an integer greater than 0.

20. The apparatus according to claim 16, wherein the first sequence satisfies the following formulas:

$$r(n) = Ae^{j\alpha n}x_q(n \bmod N_{ZC}), n = 0, 1, 2, \ldots, W-1$$

$$x_q(m) = e^{-j\frac{\pi qm(m+1)}{N_{ZC}}}$$

wherein r(n), n=0,1, 2, ..., W−1 is the first sequence, $N_{ZC}$ is a maximum prime number less than or equal to W, a minimum prime number greater than W, a maximum prime number less than or equal to 2 W, or a minimum prime number greater than 2 W, q is an integer greater than 0 and less than $N_{ZC}$, A is a complex constant unrelated to n, $\alpha$ is a real constant unrelated to n, and j is an imaginary unit.

* * * * *